(12) United States Patent
Pajukoski et al.

(10) Patent No.: US 8,565,161 B2
(45) Date of Patent: Oct. 22, 2013

(54) ADAPTIVE FREQUENCY REUSE SCHEME

(75) Inventors: Kari Pajukoski, Oulu (FI); Esa Tiirola, Oulu (FI)

(73) Assignee: Nokia Corporation, Espoo (FI)

( * ) Notice: Subject to any disclaimer, the term of this patent is extended or adjusted under 35 U.S.C. 154(b) by 1069 days.

(21) Appl. No.: 11/240,529

(22) Filed: Oct. 3, 2005

(65) Prior Publication Data
US 2006/0268755 A1 Nov. 30, 2006

(30) Foreign Application Priority Data

May 31, 2005 (EP) .................................... 05011734

(51) Int. Cl.
*H04W 4/00* (2009.01)
(52) U.S. Cl.
USPC ............................. 370/329; 370/344; 370/437
(58) Field of Classification Search
USPC ......................................... 370/329, 344, 437
See application file for complete search history.

(56) References Cited

U.S. PATENT DOCUMENTS

| | | | |
|---|---|---|---|
| 6,012,161 A * | 1/2000 | Ariyavisitakul et al. | 714/795 |
| 6,975,869 B1 * | 12/2005 | Billon | 455/452.1 |
| 7,085,306 B1 * | 8/2006 | Voldman et al. | 375/132 |
| 8,077,692 B2 * | 12/2011 | Khandekar et al. | 370/344 |
| 2003/0013451 A1 * | 1/2003 | Walton | 455/447 |
| 2003/0227889 A1 | 12/2003 | Wu et al. | |
| 2005/0096061 A1 | 5/2005 | Ji et al. | |
| 2005/0152466 A1 * | 7/2005 | Maltsev et al. | 375/260 |
| 2006/0159004 A1 * | 7/2006 | Ji | 370/208 |
| 2006/0233124 A1 * | 10/2006 | Palanki | 370/319 |

FOREIGN PATENT DOCUMENTS

| | | | | |
|---|---|---|---|---|
| WO | WO 00/01181 | * | 1/2000 | ............... H04Q 7/34 |
| WO | WO 01/50807 | | 7/2001 | |

OTHER PUBLICATIONS

International Search Report for International Application No. PCT/IB2006/001427, filed May 31, 2006.
Decision of Rejection; dated Oct. 26, 2011, Issued on Corresponding Application No. 200680019177.X.

* cited by examiner

*Primary Examiner* — Jason Mattis
(74) *Attorney, Agent, or Firm* — Squire Sanders (US) LLP

(57) ABSTRACT

The present invention relates to a method and system for transmitting data in cellular network, wherein frequency reuse is proposed to be designed adaptive and utilized only only when needed, e.g., with small coding rates. The adaptive reuse can be obtained by using the conventional link adaptation approach. The invention can be easily applied to a Frequency Division Multiple Access (FDMA) system which consists of combination of localized and distributed FDMA. Thereby, better resistance against strong other cell interference can be provided.

23 Claims, 2 Drawing Sheets

ADAPTIVE FREQUENCY REUSE SCHEME

FIELD OF THE INVENTION

The invention relates to a method and system for transmitting data from a transmitter to a receiver in a cellular network using a frequency division multiple access scheme.

BACKGROUND OF THE INVENTION

Currently, work is in progress to set new standards, on which a long term evolution of the UMTS (Universal Mobile Telecommunication System) terrestrial radio access network (UTRAN) will be based. An evolved UTRAN (EUTRAN), also referred to as a 3.9G system in allusion to the current third-generation (3G) system, is expected to provide enhanced transmission performance. It is presumed that the 3.9G system will be based on the multi carrier technology of orthogonal frequency division multiple access (OFDMA) in the downlink (DL) radio transmission from the network to the subscribed wireless terminal devices. The uplink (UL) radio transmission technology of the coming 3.9G system is expected to be a single-carrier frequency division multiple access (SC-FDMA) technology.

In FDMA technology, an available frequency band is divided into sub-bands forming individual transmission channels. In SC-FDMA, a single sub-band is assigned to an uplink radio connection from a wireless terminal device to a wireless access network node.

An assumption regarding the frequency re-use for OFDM has been that the same 5 MHz carrier can be re-used in each cell, which is often referred to as full frequency re-use, or frequency re-use factor of 1. The main benefit of such a frequency re-use is mainly ease of deployment, given that no frequency planning is required. In the case of the introduction of OFDM in UTRAN, it would be also desirable to maintain this property, which is already available with WCDMA (Wideband Code Division Multiple Access). It is noted however that using the same 5 MHz carrier in each cell does not necessarily imply that all of the OFDM sub-carriers would be re-used equally in each cell.

Given a frequency re-use factor of 1, the system becomes interference-limited by the other cell interference, and the interference perceived by the receiver.

Coverage area probability is thus limited in orthogonal systems like OFDMA or SC-FDMA due to the other cell interference. The amount of other cell interference depends mainly on the frequency reuse of the system. From this point of view, 3.9G system is rather challenging since the working assumption is reuse 1 and at the same time good system performance with coverage area probability of 95% is targeted.

Other cell interference translates into degradation of the radio performance, i.e., Signal-to-Interference-Noise ratio (SINR) is degraded. The quality of service (QoS) of the radio link can be maintained by increasing the amount of processing gain (i.e., more coding or spreading). There are also other techniques like Interference Cancellation (IC) and Interference Rejection Combining (IRC) which can mitigate the other cell interference quite effectively.

GSM/EDGE (Global System for Mobile communications/Enhanced Data rates for GSM Evolution) systems utilize fixed frequency reuse combined with frequency hopping, while WCDMA systems mitigate other cell interference using spreading and channel coding.

SUMMARY OF THE INVENTION

It is an object of the invention to provide a method and system, by means of which better resistance against other cell interference can be achieved.

This object is achieved by a method for transmitting data from a transmitter to a receiver in a cellular network using a frequency division multiplex, said method comprising the steps of: determining transmission quality of a transmission link between said transmitter and said receiver and forwarding an information about said transmission quality to said transmitter; and selecting based on said forwarded information one of at least two frequency reuse patterns for transmission via said transmission link.

Furthermore, the above object is achieved by a transmission system for transmitting data from a transmitter to a receiver in a cellular network using a frequency division multiplex, said system comprising:

determination means for determining transmission quality of a transmission link between said transmitter and said receiver;

forwarding means for forwarding an information about said determined transmission quality to said transmitter; and selection means for selecting based on said forwarded information one of at least two frequency reuse patterns for transmission via said transmission link.

Additionally, the above object is achieved by a transmitter for transmitting data to a receiver in a cellular network using frequency division multiplex, said transmitter comprising:

receiving means for receiving an information about a transmission quality of a transmission link between said transmitter and said receiver; and selection means for selecting based on said received information one of at least two frequency reuse patterns for transmission via said transmission link.

Finally, the above object is achieved by a receiver for receiving data from a transmitter in a cellular network using frequency division multiplex, said receiver comprising:

determination means for determining transmission quality of a transmission link between said transmitter and said receiver; and forwarding means for forwarding an information about said determined transmission quality to said transmitter.

Accordingly, higher throughput and better coverage are achieved because the frequency reuse is used only when needed. Moreover, compared to a spreading system, frequency reuse provides better resistance against strong other cell interference than spreading since it removes completely the interference signal originating from different frequency bands.

The information about said determined transmission quality may be determined at the receiver.

Based on the forwarded information about the determined transmission quality, a transmission scheme may be set, which defines at least one of a modulation scheme and a coding scheme, wherein the selected frequency reuse pattern may be coupled to the transmission scheme. The transmission scheme may be set according to a link adaptation approach. In a specific example, the setting step may comprise setting a first transmission scheme with a first modulation order and a first coding rate, checking said transmission quality, and changing based on the checking result to a second transmission scheme with a second modulation order and a second coding rate, wherein at least one of the second modulation order and the second coding rate differs from the first modulation order and the first coding rate, respectively. The setting step may be repeated until a predetermined target quality has been reached. The first modulation order may be higher than the second modulation order and the first coding rate may be higher than the second coding rate.

Furthermore, the selected frequency reuse pattern may be changed from a reuse factor equal to one to a reuse factor larger than one, if the second coding rate has reached a predetermined threshold value.

A plurality of localized sub bands of a total transmission band may be used for transmission by at least one first transmission scheme, and a plurality of distributed sub bands of the total transmission band may be used for transmission by at least one second transmission scheme, wherein the at least one first transmission scheme is related to a frequency reuse factor equal to one and the at least one second transmission scheme is related to a frequency reuse factor larger than one. The distributed sub bands may be obtained by at least one of an interleaved frequency division multiple access technique, a precoded orthogonal frequency division multiple access technique, and an orthogonal frequency division multiple access technique.

Each cell of the cellular network may be provided with a list of frequencies to be used in the cell area with a predetermined code rate. As an option, this list may be time variant.

Further advantageous developments are defined in the dependent claims.

BRIEF DESCRIPTION OF THE DRAWINGS

In the following, the present invention will be described based on an embodiment with reference to the accompanying drawings in which.

DESCRIPTION OF THE PREFERRED EMBODIMENT

The embodiment of the present invention will now be described in connection with cellular radio transmission system, such as a 3.9G system which represents UTRAN long term evolution based on the corresponding 3GPP standards. In the embodiment, DL radio transmission is based on multicarrier technology (OFDMA) and UL radio transmission is based on SC-FDMA, respectively.

Figure 1:
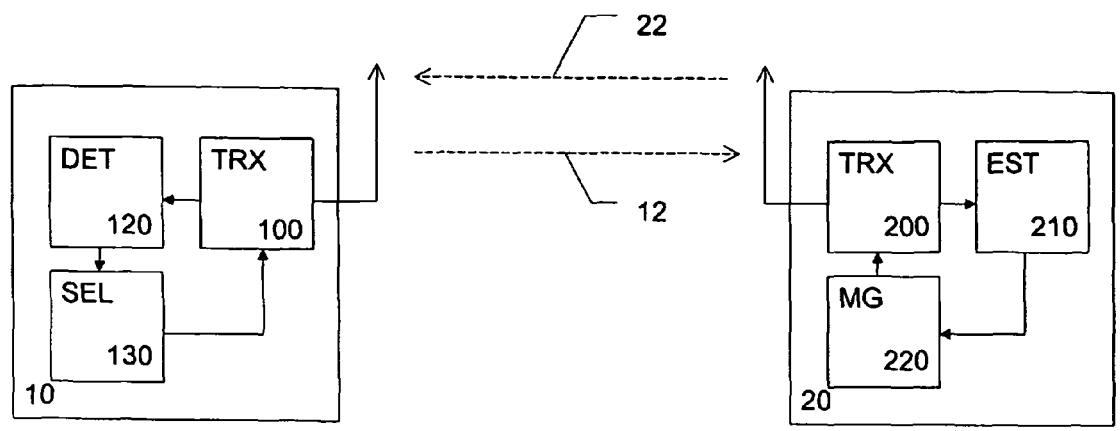
FIG. 1 shows a schematic block diagram of a radio transmission system according to the embodiment.

FIG. 1 shows a schematic block diagram of a radio transmission system according to the embodiment. An adaptive reuse principle is introduced, which covers both UL and DL directions, i.e., radio transmission from a transmitter part of a transceiver 100 at a terminal device 10 (mobile phone device) or user equipment (UE) to a receiver part of a transceiver 200 at a base station device 20 or node B and radio transmission from a transmitter part of the transceiver 200 at the base station device 20 or node B to a receiver part of the transceiver 100 at the terminal device 10 (mobile phone device) or UE.

According to the embodiment, frequency reuse is made adaptive and introduced only when needed. In particular, frequency reuse is controlled or selected in dependence on the transmission quality (e.g. Quality of Service (QoS)), for example only for small coding rates. The frequency reuse is defined by a reuse factor r which defines the number of cells in a cluster area, in which each cell uses a different frequency band or sub band of the available transmission bandwidth. Thus, the available transmission bandwidth is separated into r sub bands. A reuse factor r=1 thus expresses that the same frequency is used in each cell of the cellular network.

In the embodiment, the adaptive reuse scheme is obtained by using a link adaptation approach with supported modulation and coding schemes as defined in the following Table 1.

TABLE 1 supported modulation and coding schemes

| MCS No. | Modulation | ECR | Frequency Reuse Factor r | Rate [Mbit/s] | Tx Bw [kHz] |
| --- | --- | --- | --- | --- | --- |
| 1 | 16QAM | 2/3 | 1 | 0.58 | 313 |
| 2 | QPSK | 2/3 | 1 | 0.58 | 625 |
| 3 | QPSK | 1/3 | 1 | 0.58 | 1250 |
| 4 | QPSK | 1/6 | 4 | 0.58 | 2500 |
| 5 | QPSK | 1/12 | 8 | 0.58 | 5000 |

As an example, the first transmissions can be made by using a modulation and coding scheme (MCS) with high order of the modulation and high coding rate (cf. MCS#1, MCS#2 or MCS#3 in Table 1). If the QoS (Quality of Service) is determined at the transmitter (based on a feedback information) to be below a predetermined target value, then the MCS number is increased by a corresponding selection function or unit of the transmitter according to Table 1 (i.e., the effective coding rate (ECR) and/or order of the modulation are decreased). This is repeated until the targeted QoS level is achieved. Then, at some point an MSC (i.e., MCS#4 or MCS#5 in Table 1) is selected, which is coupled to a frequency reuse larger than "1", e.g., r=4 or 8 as indicated in Table 1.

If needed, it is possible to return to an MCS without frequency reuse (r=1) by decreasing the MCS number according to Table 1 (i.e. reduce coding rate and/or order of the modulation).

The transmission quality is checked or estimated at an estimation function or unit 210 of the base station device 20 and corresponding feedback information 22 indicating the transmission quality is generated in a message generation function or unit 220 and forwarded back to the transceiver 100 of the terminal device 10, e.g. using a suitable feedback channel. At the terminal device 10, the feedback information 22 is received by the transceiver 100 and the transmission quality is determined or detected at a detection unit 120. Based on this transmission quality, a suitable transmission scheme is selected at a selection function or unit 130 of the terminal device 10, and used for transmission of an UL transmission signal 12.

Of course, the same principle can be applied vice versa in the DL direction, i.e. the feedback information 22 is then transmitted in the UL direction.

Figure 2:
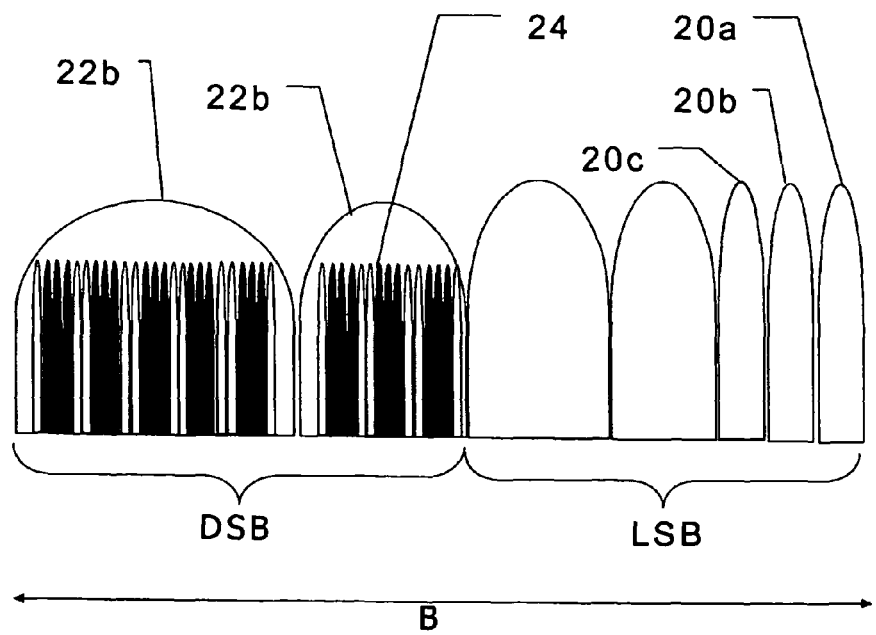
FIG. 2 shows a schematic diagram indicating a frequency spectrum of an FDMA system with distributed and localized frequency bands according to an embodiment of the present invention.

The invention can be easily applied to FDMA system which consists of combination of localized and distributed FDMA sub bands as shown in FIG. 2. The transceiver 100 uses the MCSs #1, #2 and #3 for transmission within localized sub bands 20a, 20b, 20c in a localized sub band frequency range LSB as a part of the total bandwidth B. Additionally, depending on the transmission quality (e.g. QoS) derived e.g. from the feedback information 22, the transceiver 100 may use the MCSs #4 and #5 for transmitting a transmission signal 12 within distributed sub bands 24 located in cluster-specific frequency bands 22a, 22b. A more generalized option could be the case where the selection of the transmission scheme or format (i.e., Localized FDMA/Distributed FDMA) is coupled with the selection of the frequency greuse pattern. The distributed sub bands 24 can be generated for example using well-known IFDMA (Interleaved FDMA), PR-OFDMA (Precoded OFDMA) or OFDMA techniques. The frequencies to be used in different cells can be listed in advance. Each cell may have stored or provided a list of frequencies pins (tones) that are utilized in the cell area with a certain code rate. As a further option, this list may be time variant.

Figure 3:
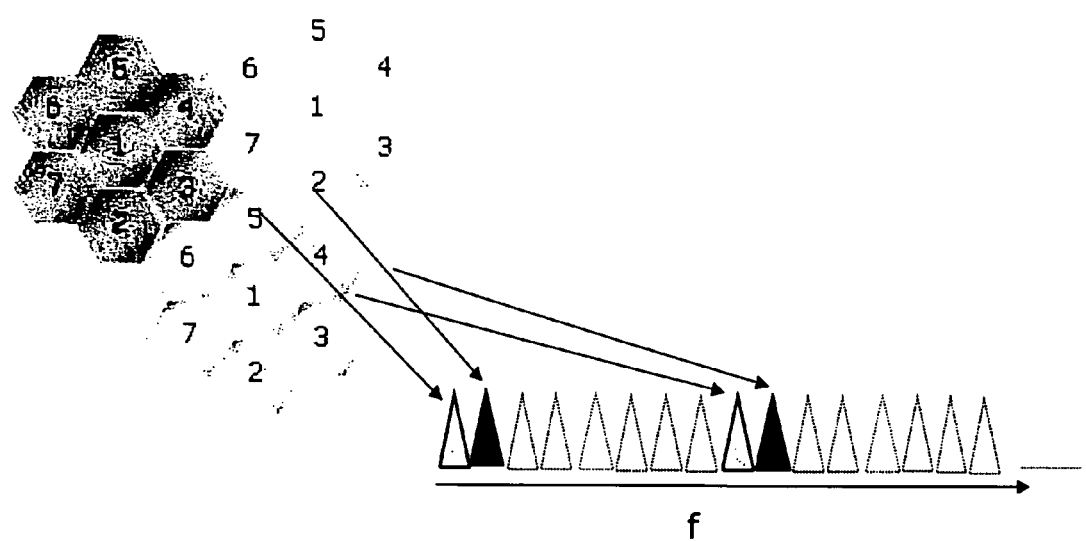
FIG. 3 shows a schematic diagram illustrating a grid of hexagonal cells in a cellular network using distributed FDMA with frequency reuse.

FIG. 3 shows an example of a cellular network with a grid of hexagonal cells utilizing the adaptive frequency reuse scheme of the embodiment with reuse factor r=7 (or reuse ratio 1/7). In FIG. 3, reuse transmission for two different users or cells is shown with a corresponding frequency diagram indicating the location of the allocated frequencies on a horizontal frequency axis. As can be gathered from FIG. 3, different frequencies of the distributed sub bands are used in seven adjacent cells of a cluster area, so that inter-cell interference is reduced. However, depending on the determined transmission quality, the transmission scheme may be changed to a reuse factor r=1, where each frequency can be used in each cell, so that the same frequency may be allocated to different users in adjacent cells.

According to the embodiment, higher throughput and better coverage is obtained due to the fact that frequency reuse is used only when needed. For example when the terminal device 10 is located close to the base station device 20, transmission quality is high and a frequency reuse factor r larger than 1 is not needed because the interference from other cells is orthogonalized by path loss. On the other hand, if the terminal device 10 is located close to a cell edge, it is beneficial to have frequency reuse (r>1) for the terminal device 10 of that user, since it generates so much interference to the other cells.

In general, frequency reuse provides better resistance against strong inter-cell interference than spreading which is used e.g. in WCDMA systems. Spreading by code with spreading factor SF=2 improves the cell interference (C/I) performance by around 3 dB. At the same time frequency reuse removes completely the interference signal originating from different frequency bands.

In the described embodiment, some simple frequency planning is required. However, to work optimally FDMA systems require some kind of "frequency planning" anyway. E.g., when the system load is low it is better to utilize different frequencies in adjacent cells.

In summary, frequency reuse is proposed to be designed adaptive and utilized only only when needed, e.g., with small coding rates. The adaptive reuse can be obtained by using the conventional link adaptation approach. The invention can be easily applied to FDMA system which consists of combination of localized and distributed FDMA. Thereby, better resistance against strong other cell interference can be provided.

It is to be noted that the present invention is not restricted to the above preferred embodiment and can be implemented in any cellular data network with a frequency reuse scheme. Any kind of adaptive reuse pattern with a specific reuse factor may be selected in dependence on the transmission quality which not necessarily needs to be determined at the receiver, but could as well be determined by another network node or function. The transmission schemes of Table 1 are only specific examples and may be replaced by other suitable transmission schemes adapted to the individual implementation. The preferred embodiments may thus vary within the scope of the attached claims.

The invention claimed is:

1. A method, comprising:
   receiving information about transmission quality of a transmission link between a first transceiver and a second transceiver, the information being received at the second transceiver;
   selecting, at the second transceiver, for the first transceiver, a frequency reuse pattern from a plurality of frequency reuse patterns available for transmission at the same time based on said received information via said transmission link; and
   setting, at the second transceiver, based on said received information, a transmission scheme which defines at least one of a modulation scheme and a coding scheme, wherein said selected frequency reuse pattern is coupled to said transmission scheme, and said at least one of the modulation scheme and the coding scheme is specific to said first transceiver, and
   wherein the first transceiver is configured to utilize said at least one of the modulation scheme and the coding scheme, to transmit within both localized sub bands in a localized sub band frequency range and to transmit within distributed sub bands in cluster-specific frequency bands.

2. The method of claim 1, wherein said setting comprises setting a first transmission scheme with a first modulation order and a first coding rate, checking said transmission quality, and changing, based on the checking, to a second transmission scheme with a second modulation order and a second coding rate, wherein at least one of said second modulation order and said second coding rate differs from said first modulation order and said first coding rate, respectively.

3. The method of claim 1, wherein said setting is repeated until a predetermined target quality has been reached.

4. The method of claim 2, wherein said first modulation order is higher than said second modulation order and said first coding rate is higher than said second coding rate.

5. The method of claim 2, wherein said selected frequency reuse pattern is changed from a reuse factor equal to one to a reuse factor larger than one when said second coding rate has reached a predetermined threshold value.

6. The method of claim 1, wherein said transmission scheme is set according to a link adaptation approach.

7. The method of claim 1, further comprising using a plurality of localized sub bands of a total transmission band for transmission by at least one first transmission scheme, and using a plurality of distributed sub bands of said total transmission band for transmission by at least one second transmission scheme, wherein said at least one first transmission scheme is related to a frequency reuse factor equal to one and said at least one second transmission scheme is related to a frequency reuse factor larger than one.

8. The method of claim 7, wherein said distributed sub bands are obtained by at least one of an interleaved frequency division multiple access technique, a precoded orthogonal frequency division multiple access technique, and an orthogonal frequency division multiple access technique.

9. The method of claim 1, further comprising providing at each cell of a cellular network a list of frequencies to be used in the cell area with a predetermined code rate.

10. The method of claim 9, wherein said list is time variant.

11. A system, comprising:
   an estimator configured to determine transmission quality of a transmission link between a first transceiver and a second transceiver, wherein the first transceiver comprises the estimator and is configured to forward information about said determined transmission quality to said second transceiver;
a selector configured to select, for the first transceiver, a frequency reuse pattern from a plurality of frequency reuse patterns available for transmission at the same time based on said forwarded information via said transmission link, wherein the second transceiver comprises the selector; and
a processor configured to set, based on said forwarded information, a transmission scheme which defines a least one of a modulation scheme and a coding scheme, wherein the second transceiver comprises the processor,
wherein said selected frequency reuse pattern is coupled to said transmission scheme, and said at least one of the modulation scheme and the coding scheme is specific to the first transceiver, and
wherein the first transceiver is configured to utilize said at least one of the modulation scheme and the coding scheme, to transmit within both localized sub bands in a localized sub band frequency range and to transmit within distributed sub bands in cluster-specific frequency bands.

12. An apparatus comprising:
a processor; and
a memory including computer program code,
the memory and the computer program code are configured to, with the processor, cause the apparatus at least to
  receive an information about a transmission quality of a transmission link between said apparatus and a transceiver,
  selects, for the transceiver, a frequency reuse pattern from a plurality of frequency reuse patterns available for transmission at the same time based on said received information via said transmission link,
  set, based on said received information, a transmission scheme which defines a least one of a modulation scheme and a coding scheme, wherein said selected frequency reuse pattern is coupled to said transmission scheme, and said at least one of the modulation scheme and the coding scheme is specific to the transceiver, and
  wherein the transceiver is configured to utilize said at least one of the modulation scheme and the coding scheme, to transmit within both localized sub bands in a localized sub band frequency range and to transmit within distributed sub bands in cluster-specific frequency bands.

13. The apparatus of claim 12, wherein the memory and the computer program code are further configured to, with the processor, cause the apparatus at least to set a first transmission scheme with a first modulation order and a first coding rate and change, based on said determined transmission quality, to a second transmission scheme with a second modulation order and a second coding rate, wherein at least one of said second modulation order and said second coding rate differs from said first modulation order and said first coding rate, respectively.

14. The apparatus of claim 12, wherein the memory and the computer program code are further configured to, with the processor, cause the apparatus at least to repeat said setting until a predetermined target quality has been reached.

15. The apparatus of claim 13, wherein said first modulation order is higher than said second modulation order and said first coding rate is higher than said second coding rate.

16. The apparatus of claim 13, wherein the memory and the computer program code are further configured to, with the processor, cause the apparatus at least to change said selected frequency reuse pattern from a reuse factor equal to one to a reuse factor larger than one when said second coding rate has reached a predetermined threshold value.

17. The apparatus of claim 12, wherein the memory and the computer program code are further configured to, with the processor, cause the apparatus at least to set said transmission scheme according to a link adaptation approach.

18. The apparatus of claim 12, wherein the memory and the computer program code are further configured to, with the processor, cause the apparatus at least to use a plurality of localized sub bands of a total transmission band for transmission by at least one first transmission scheme, and use a plurality of distributed sub bands of said total transmission band for transmission by at least one second transmission scheme, wherein said at least one first transmission scheme is related to a frequency reuse factor equal to one and said at least one second transmission scheme is related to a frequency reuse factor larger than one.

19. The apparatus of claim 18, wherein said distributed sub bands are obtained by at least one of an interleaved frequency division multiple access technique, a precoded orthogonal frequency division multiple access technique, and an orthogonal frequency division multiple access technique.

20. The apparatus of claim 12, wherein a list of frequencies to be used in the cell area with a predetermined code rate is provided at each cell of a cellular network.

21. The apparatus of claim 12, wherein the transceiver is a mobile phone device.

22. The apparatus of claim 12, wherein the apparatus is a base station device.

23. A non-transitory computer-readable storage medium encoded with instructions configured to control a processor to perform a process, the process comprising:
  receiving information about transmission quality of a transmission link between a first transceiver and a second transceiver, wherein the information is received at the second transceiver;
  selecting, at the second transceiver, for the first transceiver, a frequency reuse pattern from a plurality of frequency reuse patterns available for transmission at the same time based on said received information via said transmission link; and
  setting, at the second transceiver, based on said received information, a transmission scheme which defines at least one of a modulation scheme and a coding scheme, wherein said selected frequency reuse pattern is coupled to said transmission scheme, and said at least one of the modulation scheme and the coding scheme is specific to the first transceiver, and
  wherein the first transceiver is configured to utilize said at least one of the modulation scheme and the coding scheme, to transmit within both localized sub bands in a localized sub band frequency range and to transmit within distributed sub bands in cluster-specific frequency bands.

* * * * *